UNITED STATES PATENT OFFICE.

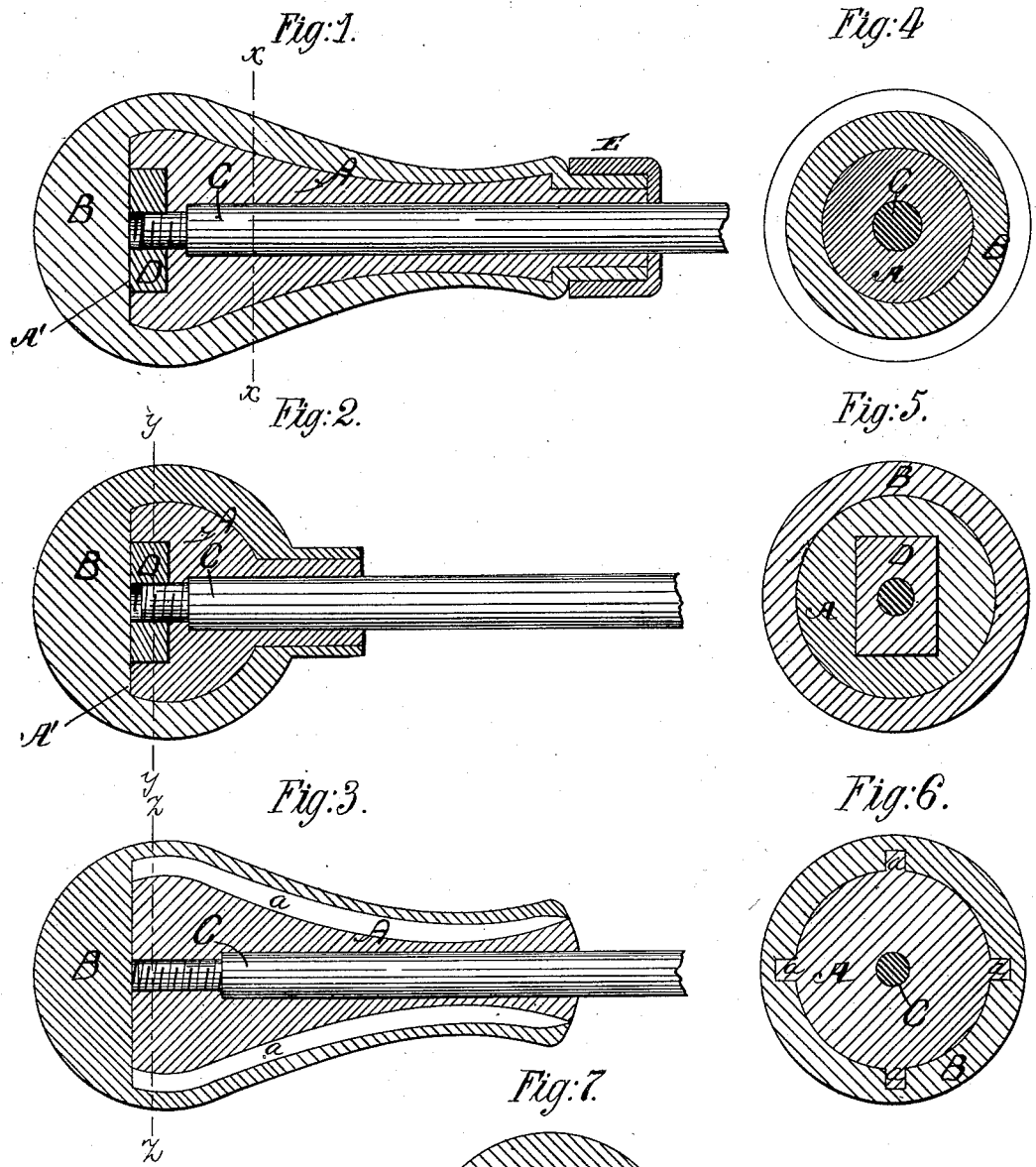

ABEL D. TYLER, OF BROCKTON, MASSACHUSETTS.

RUBBER-COVERED HANDLE.

SPECIFICATION forming part of Letters Patent No. 264,798, dated September 19, 1882.

Application filed April 28, 1881. (No model.) Patented in England April 20, 1880, No. 1,624.

*To all whom it may concern:*

Be it known that I, ABEL D. TYLER, of Brockton, in the county of Plymouth and State of Massachusetts, have invented certain new and useful Improvements in Handles or Holders for Bicycles, Tools, &c., (for which Letters Patent of Great Britain were issued April 20, 1880, No. 1,624,) of which the following is a full, clear, and exact description.

This invention relates to that class of tool handles or holders for which Letters Patent No. 244,251 were granted to me February 3, 1880.

Prior to my present improvement a thin elastic covering has been drawn upon a wrench-handle, mainly to keep the operator's hand from slipping, also, rubber has been molded around flanged or grooved cylinders in order to form rolls for wringers.

The present invention, however, relates to a handle or holder for tools, velocipedes, and the like, and is formed and designed to be grasped by hand.

My handle is composed superficially entirely of rubber, or of any of its elastic or non-elastic compounds.

To save material, and at the same time to afford means for securing the handle to the tang, shank, or handle-rod, I create within this rubber handle a central core substantially adapted to the shape of the exterior of the handle, and having a central bore and a nut located at one end thereof. This arrangement is effected by first adjusting the nut in place, and then molding and vulcanizing the handle. The nut and bore of the core are now ready to receive the tang, rod, or shank, which will be screw-threaded at one end, so as to engage the nut. The difference, then, between my invention and the other devices hereinafter cited will be apparent.

Figure 1 is a longitudinal section through a handle or holder constructed in accordance with my improvement. Fig. 2 is a like view of a somewhat modified form. Fig. 3 is a longitudinal section, illustrating the core of the handle or holder formed with longitudinal ribs. Fig. 4 is a transverse section taken on the line *x x*, Fig. 1. Fig. 5 is a transverse section taken on the line *y y* of Fig. 2. Fig. 6 is a transverse section taken on the line *z z*, Fig. 3. Fig. 7 is a similar transverse section, and illustrates the core formed with longitudinal grooves in lieu of ribs.

Referring by letter to the drawings, A indicates a core, composed of wood, metal, or any other material suitable for forming a strong foundation for the rubber covering with which it is enveloped. This core, while approximating to the shape of the ordinary handle of a velocipede or any usual tool, is preferably cut off square at its larger end, as shown at A', so that when the rubber coating is applied and symmetrically rounded off at this end of the handle there will be an excess of rubber at such end.

The core A has a covering, B, of rubber or any of its elastic or non-elastic compounds, which is molded and vulcanized about the said core, so as to firmly hold the covering upon the core, and thus, to all intents and purposes, form a handle superficially composed of rubber or the like, and at the same time effect a great saving of rubber. Prior to thus molding and vulcanizing the rubber or other elastic compound around the core a nut, D, is set in a recess in the butt-end of the core, so that after the rubber has been molded and vulcanized, as described, it will conceal and hold the nut firmly within its seat. This core is also formed with an axial bore extending from end to end and in line with the opening through the nut. The handle is now ready to be secured to the tang of a tool or to one of the handle-rods of a velocipede, and in thus securing it the tang or handle-rod C is received into the bore of the core A and the screw-threaded end of said tang or rod fitted into the nut D by turning the handle thereon.

In Fig. 1 a cap, E, is shown applied to one end of the completed handle, and in Fig. 2 the handle, instead of having the elongated form shown in Fig. 1, is made spherical with a short neck.

Figs. 6 and 7 illustrate one way in which the elastic covering can be effectually prevented from turning upon the core, and to this end the core is formed with longitudinal ribs *a*, between which the rubber or other elastic compound will be packed during the molding of the same; but in lieu of these ribs it will be evident that the same result could be attained by forming in the core a series of longitudinal grooves, *b*, as illustrated by Fig. 7. In molding the rubber or other elastic compound around the core, it will be received in these grooves, and hence serve to assist in connecting the core and its covering together.

Having thus described my invention, what I claim is—

A handle or holder superficially composed of india-rubber or any of its elastic or non-elastic compounds molded and vulcanized upon and about a central core, which is formed with an axial bore, and provided at one end with a nut having its opening in line with the bore of the central core, said bore and nut being adapted to receive the tang of a tool or the handle-rod of a velocipede, or the like, substantially as described.

In testimony whereof I have hereunto set my hand in the presence of two subscribing witnesses.

ABEL D. TYLER.

Witnesses:
EDWIN W. BROWN,
WILLIAM S. BELLOWS.